United States Patent [19]

Barthélemy

[11] Patent Number: 4,576,056

[45] Date of Patent: * Mar. 18, 1986

[54] ROTARY ASSISTANCE MECHANISM, PARTICULARLY FOR VEHICLE STEERING

[75] Inventor: André Barthélemy, Saint Remy-lès-Chevreuse, France

[73] Assignees: Automobiles Citroen; Automobiles Peugeot, both of Paris, France

[*] Notice: The portion of the term of this patent subsequent to Oct. 11, 2000 has been disclaimed.

[21] Appl. No.: 398,873

[22] Filed: Jul. 16, 1982

[51] Int. Cl.[4] ............... F16H 35/00; B62D 3/00; B62D 7/00; B62D 9/00

[52] U.S. Cl. ..................... 74/388 PS; 180/79.1; 74/388 R

[58] Field of Search ............ 180/79.1; 74/388 PS, 74/388; 192/0.02 R, 48.4, 48.6, 48.92, 21; 310/75 D, 83, 69

[56] References Cited

U.S. PATENT DOCUMENTS

| 2,688,256 | 9/1954 | Förster ............... 192/48.6 |
| 2,833,154 | 5/1958 | Barnes et al. . |
| 2,972,902 | 2/1961 | Rockwell ............ 74/388 PS |
| 4,241,804 | 12/1980 | Deininger et al. ......... 180/79.1 |
| 4,319,672 | 3/1982 | Barthelemy ............ 74/388 R |
| 4,409,503 | 10/1983 | Barthelemy ............ 74/388 R |
| 4,416,345 | 11/1983 | Barthelemy ............ 180/79.1 |

FOREIGN PATENT DOCUMENTS

| 0051015 | 5/1982 | European Pat. Off. ........... 180/79.1 |
| 2247135 | 3/1974 | Fed. Rep. of Germany . |
| 2817190 | 10/1979 | Fed. Rep. of Germany . |
| 1096781 | 4/1953 | France . |
| 92899 | 12/1968 | France . |
| 2406557 | 5/1979 | France . |
| 2417676 | 9/1979 | France . |
| 2492558 | 10/1980 | France . |

Primary Examiner—Lawrence J. Staab
Assistant Examiner—Michael D. Bednarek
Attorney, Agent, or Firm—Stevens, Davis, Miller & Mosher

[57] ABSTRACT

A mechanism adapted to be coupled to a driven member capable of rotating alternately in both directions, in response to the rotation of a drive shaft. This mechanism comprises a motor, a gear train for reducing the speed of the motor and two clutches associated respectively with each direction of rotation, a control device for controlling the clutches positioned to bring into action one of the clutches depending on the direction and the amplitude of the torque applied to the drive shaft so that the driven member is driven by the motor and the gear train in the desired direction. Each clutch is connected to rotate the driven member through a unidirectional coupling which ensures that the driven member is rotated by the actuated clutch and not the reverse.

10 Claims, 5 Drawing Figures

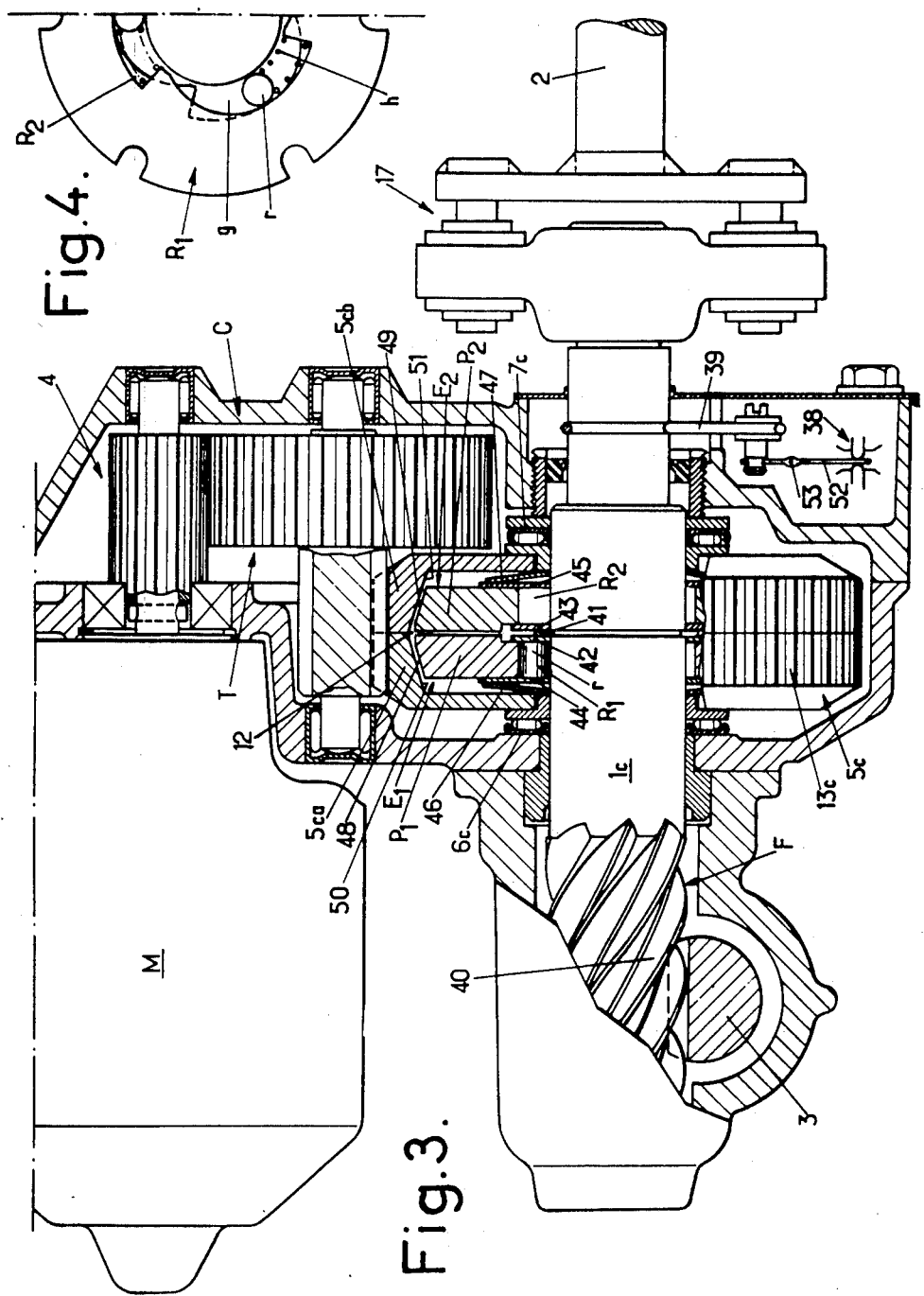

ROTARY ASSISTANCE MECHANISM, PARTICULARLY FOR VEHICLE STEERING

BACKGROUND OF THE INVENTION

The invention relates to a rotary assistance mechanism adapted to be coupled to a driven member capable of rotating alternately in both directions, in response to the rotation of a drive shaft. A mechanism of this kind includes a motor, means for reducing the speed of the motor and two clutches associated respectively with each rotational direction, and means for controlling the clutches so as to bring one of the clutches into operation depending on the direction and the amplitude of the torque exerted on the drive shaft whereby the driven member is driven by the motor and the reduction means in the desired direction, through the actuated clutch.

The invention relates more particularly to the rise of such rotary assistance mechanisms for motor vehicle steering.

The invention aims especially at making rotary assistance mechanisms of the kind in question more responsive and particularly reducing their resistant torque when the motor is stopped and when the driven member is driven by the drive shaft.

SUMMARY OF THE INVENTION

According to the invention, the rotary assistance mechanism, adapted to be coupled to a driven member capable of rotating alternately in both directions in response to the rotation of a drive shaft, is characterized by the fact that each clutch is rotatably connected to the driven member through a unidirectional coupling means adapted. This ensures that the driven member is rotated by the actuated clutch and not the reverse.

Thus, when the electric motor is stopped, it is possible to drive the driven member by means of the drive shaft without causing either the reduction means or the motor to rotate.

Advantageously, each unidirectional coupling means is formed by a freewheel.

When the motor of the mechanism rotates in both directions, the reduction means comprises a single gear train which comprises an output toothed wheel coaxial with the driven member.

According to one embodiment, this toothed wheel is mounted free to slide axially with respect to the casing whereas the driven member is secured against axial sliding with respect to this casing. The clutches in this case are provided on each side of the toothed wheel and the means for controlling the clutches are adapted to move this toothed wheel axially so as to ensure actuation of the appropriate clutch.

The means for controlling the clutch may comprise a transverse shaft connected for axial translation to an end-piece which is coaxial with the driven member and mounted to freely slide with respect to this member and with respect to the drive shaft. The shaft passes radially through at least one aperture which is in the form of a ramp inclined with respect to the longitudinal direction of the driven shaft. Resilient return means are provided between the endpiece and the driven member. In accordance with this arrangement, the shaft and the aperture cooperate due to the effect of a torque exerted on the drive shaft which causes, axial sliding of the toothed wheel in the appropriate direction.

According to a second embodiment, the toothed wheel may be secured axially with respect to the casing and the driven member is mounted to axially slide relative to this casing. The means for controlling the clutch comprises in this case gear means between the driven controllable member and a member controlled, adapted to create an axial reaction in response to the application of a torque. The movement of the driven member is caused by axial reaction. The toothed wheel is freely mounted to rotate on the driven member and each clutch, which comprises a driven plate, is connected to translation to the driven member and is connected for rotation to this member through a unidirectional coupling means. During its axial movement, the driven member drives at least one driven plate and actuates the associated clutch.

Preferably, the toothed wheel is hollow and is made in two parts joined together by removable assembly means.

When the motor is provided to rotate in a single direction, the reduction means comprise two gear trains. One of these gear trains comprises a pinion more than the other so as to provide, at its output, a rotational direction which is the reverse of the output of the other train. The clutch, in this case, is associated with each output pinion or toothed wheel of the gear train.

The invention consists of, apart from the arrangements discussed above, certain other arrangements which will be more explicitly described with reference to the accompanying drawings. The embodiments shown in these drawings are not intended to be limiting.

BRIEF DESCRIPTION OF THE DRAWINGS

FIG. 3 shows another embodiment of the mechanism of the invention;

FIG. 4, finally, is a half elevational view of the freewheels working in opposite directions.

DETAILED DESCRIPTION OF THE DRAWINGS

Figure 1:
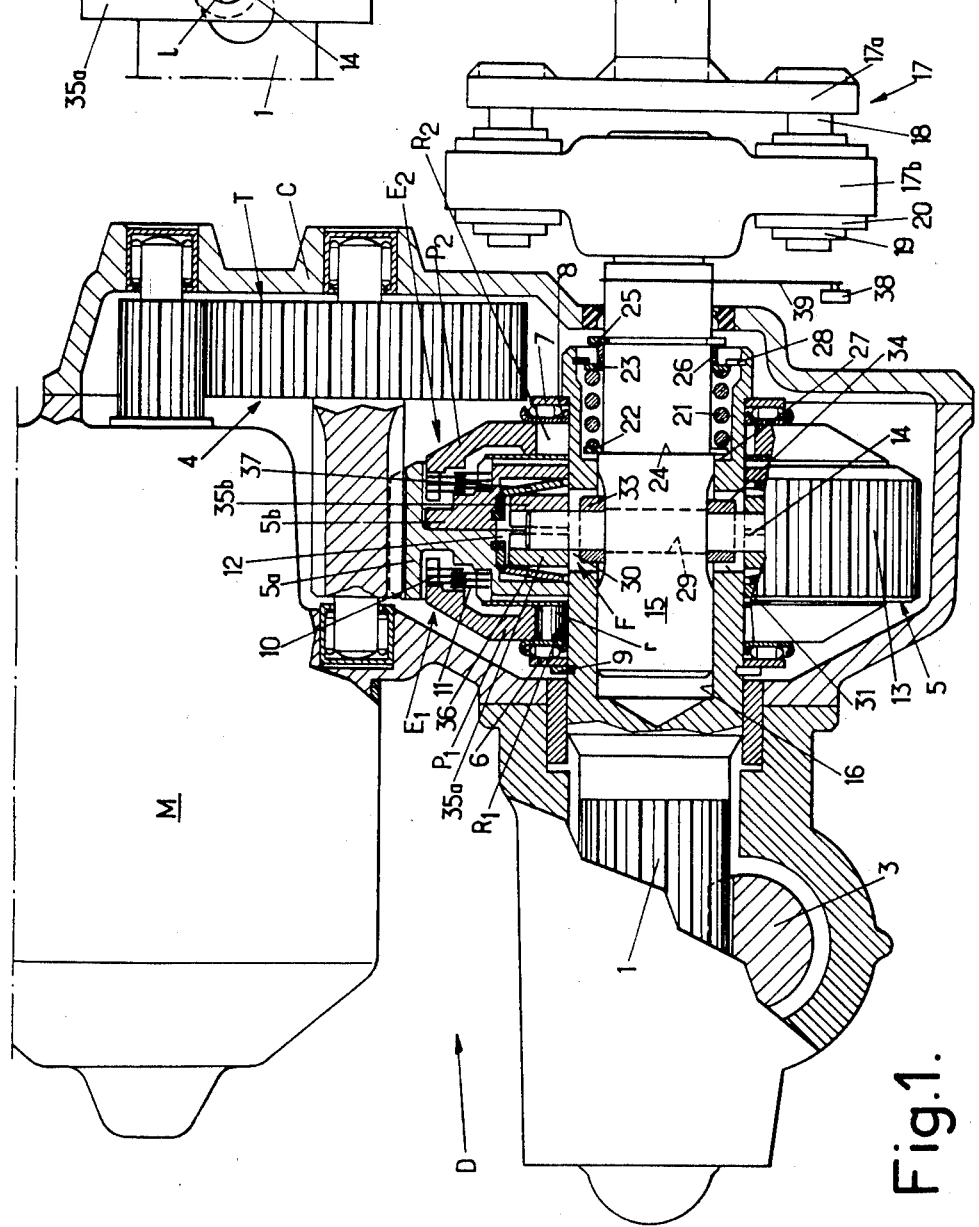
FIG. 1 of these drawings is an axial section with parts seen from the outside and parts cut away of an assistance mechanism in accordance with the invention.

Referring to FIG. 1 there can be seen a rotary assistance mechanism D adapted to be coupled to a driven member 1 capable of rotating alternately in both directions, in response to the rotation of a drive shaft 2.

In the embodiment shown, the assistance mechanism D provided for motor vehicle steering and the driven member 1 is formed by a shaft rotatably mounted in the casing C of the mechanism and carrying a pinion which cooperates with a steering rack 3.

Shaft 1 is secured against axial movement with respect to casing C while being able to rotate freely.

Mechanism D comprises a motor M, preferably an electric motor, provided so as to rotate in both directions. Reduction means T, formed by a gear train 4, are provided for reducing the rotational speed of motor M so as to drive the driven member 1.

Two clutches $E_1$, $E_2$, are provided and associated respectively with each rotational direction.

Control means F is provided for actuating one of the clutches according to the direction and the amplitude of the torque exerted on the drive shaft 2 so that the driven member 1 is driven by motor M and reduction means T in the desired direction, through the clutch.

Each clutch $E_1$, $E_2$ is connected for rotation to driven shaft 1 through an unidirectional coupling means $R_1$, $R_2$ adapted to ensure that driven shaft 1 is rotated from the cluch and not the reverse.

These unidirectional coupling means $R_1$, $R_2$ may be formed for example by two freewheels, disposed so as to work in opposite directions of rotation.

As can be seen in FIG. 4, freewheel $R_1$ is of the type having rollers r urged by resilient means h so as to cause jamming thereof in the appropriate direction, in a housing g having a decreasing radial direction and limited by two parts able to rotate with respect to each other. Freewheel $R_2$, or the same type, is disposed so as to operate in the opposite direction of rotation to that of $R_1$.

According to the embodiment of FIG. 1, where the driven member 1 is secured against axial movement with respect to casing C, gear train 4 comprises, at its output, a toothed wheel 5 coaxial with the driven member 1 and mounted for axial sliding on this member 1.

Clutches $E_1$, $E_2$ are provided on each side of this toothed wheel 5. Each clutch $E_1$, $E_2$ comprises a driven plate $P_1$, $P_2$, spaced axially apart from toothed wheel 5 when toothed wheel 5 occupies its middle position, so as to allow it to slide. These plates $P_1$, $P_2$ are mounted on shaft 1 through freewheels $R_1$, $R_2$. Stop means, formed by axialthrust roller bearings 6, 7, are provided for preventing plates $P_1$, $P_2$ from sliding. Bearing 7 bears against a shoulder 8 of member 1 whereas bearing 6 bears against a resilient ring 9 anchored in a groove in the outer periphery of member 1.

Sliding friction elements formed by discs 10, 11 are stacked alternately and are rotatably connected respectively to plates $P_1$, $P_2$ and to the toothed wheel 5. The stack of friction elements 10, 11 is clamped, during axial movement of the toothed wheel 5, between one side of this toothed wheel and the corresponding driven plate $P_1$ or $P_2$. Coupling is then provided and plate $P_1$ or $P_2$ is rotated by the toothed wheel 5. This plate, itself, rotates shaft 1 through the freewheel $R_1$ or $R_2$.

The toothed wheel 5 is hollow and formed from two parts 5a, 5b removably joined together, more especially by screws, and defining an inner volume 12 inside which are placed the means F for controlling clutches $E_1$, $E_2$.

The part 5a of the toothed wheel 5 comprises, on its outer periphery, teeth 13 forming the pinion and extending axially on each side of the mean plane of wheel 5. The cross-sectional shape of this part 5a can be seen in FIG. 1. The other part 5b forms, in a manner of speaking, a hollow flange enclosing volume 12.

Control means F comprises a transverse shaft 14 connected for axial translation to an end-piece 15, itself coaxial with the driven member 1. This end-piece 15 is mounted to freely slide with respect to the driven member in a blind bore 16 provided in this member 1, on the side turned towards drive shaft 2.

This end-piece 15 projects from bore 16 in the direction of shaft 2.

End-piece 15 is rotatably connected to drive shaft 2 through a coupling 17, more especially a resilient sleeve coupling, allowing an axial sliding of end-piece 15 with respect to shaft 2. This coupling 17 is formed, as can be seen in FIG. 1, from a plate 17a integral with shaft 2 and having pins 18 spaced evenly apart about its periphery. These pins 18 extend parallel to the axis of shaft 2 and pass freely sliding through sockets 19 mounted in elastomer material sleeves 20 which are themselves housed in holes provided in the periphery of a second plate 17b interlocked for rotation and translation with end-piece 15. The rotational torque is transmitted by pins 18 which, because of their ability to slide in sockets 19, leave end-piece 15 with freedom of axial movement.

Resilient return means are provided between end-piece 15 and the driven member 1 so as to bring the end-piece back to its mean position. These return means comprise a helical spring 21 disposed about the end-piece and working under compression between two washers 22, 23 mounted on the end-piece 15. Washer 22, on the side opposite shaft 2, abuts against a shoulder 24 of end-piece 15, but may slide on this end-piece in the opposite direction. Washer 23 is stopped, on the shaft 2 side, by means of a split resilient ring 25 anchored in a groove in end-piece 15. An adjusting distance piece 26 may be provided between washer 23 and ring 25. Washer 23 may slide on end-piece 15 in the opposite direction.

When end-piece 15 moves in a direction away from shaft 2, washer 22 bears against and is stopped axially by a shoulder 27 provided in the inner bore of member 1. During this movement, is driven by ring 25.

When end-piece 15 moves in the direction which brings it closer to shaft 2, washer 23 is stopped by a resilient split ring 28 anchored in a groove provided inside the bore of shaft 1. During this movement, washer 22 is driven by shoulder 24.

It can be seen that whatever the direction of movement of end-piece 15, with respect to shaft 2, spring 21 is compressed and exerts a return force towards the mean position.

The inner diameter of ring 28 is preferably greater than the outer diameter of ring 25 so that the amplitude of the possible travel for end-piece 15 is not limited by these two rings coming into abutment.

The transverse shaft 14 is engaged in a diametrical hole 29 of end-piece 15 and passes, on each side of the end-piece, through two aperture 30, 31 provided in the wall of the driven member 1 which surrounds bore 16. These apertures 30, 31 are limited by walls in the shape of ramps 32 (FIG. 2) inclined with respect to the longitudinal direction.

Shaft 14 is equipped on each side of end-piece 15 with two rollers 33, 34 adapted to cooperate respectively with apertures 30, 31.

Figure 2:
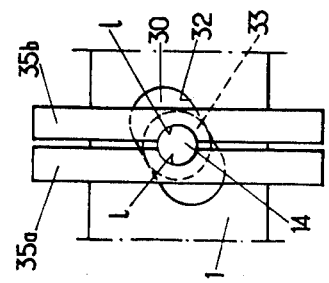
FIG. 2 is a partial top view of a detail of FIG. 1.

Each end of shaft 14 is clamped, in the longitudinal direction of shaft 2, between two washers 35a, 35b engaged about the driven member 1 and situated on each side of shaft 14 (see FIG. 2). The two facing faces of the washers comprise diametrically opposite concave imprints such as 1 (FIG. 2) adapted to be placed facing each other and to receive the ends of shaft 14. Washers 35a, 35b are pushed against shaft 14 by means of deformable resilient washers 36, 37, acting as springs and bearing against the parts 5a, 5b of the toothed wheel 5.

Control of the actuation of electric motor M in the appropriate direction of rotation is provided by a contact 38 controlled by an arm or a pin 39, shown schematically, connected for translation to end-piece 15. Contact 38 has three positions, namely a neutral position and two different work positions depending on the rotation of motor M in two different directions. One work position of contact 38 corresponds to the movement of end-piece 15 towards shaft 2 and the other work position corresponds to the movement of end-piece 15 in the opposite direction.

The operation of the rotary assistance mechanism of FIG. 1 is the following.

When drive shaft 2 is actuated in one direction, the drive torque is transmitted, by coupling 17, to end-piece 15 and from this end-piece to the driven member 1 through shaft 14 and rollers 33, 34 which cooperate with the apertures 30, 31.

Because of the inclination of walls 32, the transmission of the torque is accompanied by an axial component acting on the driven member 1. This member 1, secured against axial movement, remains motionless in translation, whereas end-piece 15, under the effect of this component, moves in the corresponding direction while compressing spring 21.

Shaft 14 washers 35a, 35b accompany end-piece 15 during its axial movement. Washers 35a, 35b push the axially mobile, toothed wheel 5, through washers 36 and 37.

The friction rings 10, 11 of the corresponding clutch are then clamped between the toothed wheel 5 and the corresponding driven plate $P_1$ or $P_2$, which are secured against axial movement.

Furthermore, since arm 39 has acted on contact 38, motor M is brought into action and the clutch, provided by friction rings 10, 11 clamped together, allows the driven member 1 to be driven by gear train 4 and motor M in the appropriate direction.

This drive takes place through freewheel $R_1$ or $R_2$ disposed so that the driven membr 1 may be driven by the plate $P_1$ or $P_2$ of the clutch which has been brought into action.

On the other hand, freewheel $R_1$, $R_2$ prevents the reverse, i.e. plate $P_1$ or $P_2$ of the clutch brought into action from being driven by driven member 1.

The amplitude of the axial movement of end-piece 15 depends particularly on the value of the torque applied to shaft 2, on the force of spring 21 and on the inclination of ramps 32. Contact 38 and arm 39 may be adjusted so as to ensure the starting up of motor M from a determined threshold (of the amplitude) of the torque applied to shaft 2.

When motor M is stopped, the driven member 1 is driven by drive shaft 2 without the gear train 4 or motor M being driven.

In fact, even if the torque applied to shaft 2 is sufficient to cause clamping of the friction rings 10 and 11 and actuation of one of clutches $E_1$, $E_2$, without motor M being started up (for example following a failure of the control contact 38 or other malfunction), the driven plate $P_1$ or $P_2$ of the clutch concerned will not be driven by the driven member 1 because of the freewheel $R_1$ or $R_2$ preventing such drive.

With reference to FIG. 3, another embodiment of the rotary assistance mechanism of the invention may be seen.

Identical parts or parts playing similar roles to those already described with reference to FIG. 1 are designated by the same reference number to which the letter c has possibly been added without description thereof being taken up again in detail.

Motor M is still provided for rotation in both rotational directions. Gear train 4 also comprises at its output a hollow toothed wheel 5c, formed by two parts 5ca and 5cb symmetrical to each other with respect to a mean plane orthogonal to the axis of shaft 2. Each part of wheel 5c comprises, on its external periphery, tooth portions which come opposite each other to form the teeth 13c.

Toothed wheel 5c is secured against axial movement with respect to casing C by means of axial-thrust roller bearings 6c, 7c.

Driven member 1c, on the other hand, is mounted for freely sliding in the axial direction with respect to casing C. This driven member 1c comprises gear means formed by screw threads 40 sloping with respect to the axial direction and adapted to cooperate with the teeth of a transverse rack 3. The cooperation of the sloping threads 40 and the teeth of the rack create an axial reaction in response to the application of a rotational torque to the driven member 1c. Toothed wheel 5c is mounted free to rotate on driven shaft 1c.

The driven plate $P_1$, $P_2$ of each clutch $E_1$, $E_2$ is disposed in the inner volume 12 of wheel 5c. Plate $P_1$ is connected to rotate member 1c by means of the freewheel $R_1$ disposed so as to ensure that member 1c is driven from plate $P_1$ for a first direction of rotation. Plate $P_2$ is adapted to rotate the driven member 1c, in the opposite direction of rotation, through freewheel $R_2$ disposed appropriately.

Plates $P_1$, $P_2$ are connected for translation to shaft 1c through a resilient split ring 41 anchored in an external groove of member 1c and disposed between plates $P_1$, $P_2$.

Washers 42, 43, serving as distance pieces, are placed between ring 41 and the transverse faces of recesses provided in plates $P_1$, $P_2$ and against freewheels $R_1$, $R_2$.

Flat washers 44, 45 are provided against the outer faces of plates $P_1$, $P_2$. Springs formed by deformable resilient washers in the form of truncated cones 46, 47, are placed bearing against abutments 6c, 7c along their inner diameter and against flat washers 44, 45 along their outer diameter. The deformable washers 46, 47 ensure clamping of ring 41 between plates $P_1$, $P_2$.

The friction surfaces of the clutches may be formed by surfaces 48, 49 in the form of trucated cones provided respectively on the outside of plates $P_1$, $P_2$ and adapted to cooperate with complementary surfaces 40, 51, also in the shape of trucated cones, provided on the inside of the toothed wheel 5c. According to another embodiment friction elements could be provided similar to rings 10, 11 of FIG. 1, mounted respectively on the plates of the clutch and in wheel 5c and connected for rotation respectively to the plates and to the toothed wheel.

Coupling 17 allows, as in the case of FIG. 1, axial sliding and so movement of driven member 1c. Arm 39 acts on the contact 38 for controlling motor M through a lever 52 pivoted at a fixed point 53 with respect to casing C.

The operation of the rotary assistance mechanism shown in FIG. 3 follows clearly from the preceding explanations.

When a torque is exerted on drive shaft 2 this torque is tranmitted to driven member 1c which will rotate and drive rack 3. The cooperation of the inclined teeth 40 and the rack generates and axial component on member 1c which slides longitudinaally in the direction corresponding to this component. Driven member 1c drives, during this axial movement, through ring 41, plate $P_1$ or $P_2$ against the force of the return spring formed by the deformable resilient washer 46 or 47.

When the torque applied to drive shaft 2 is sufficient, the movement of plate $P_1$ or $P_2$ is such that it comes to bear against toothed wheel 5c through surfaces 48 or 49. Furthermore, the electric contact 38 controlled by arm 39 brings into action motor M in the appropriate direction.

Plate $P_1$ or $P_2$, brought into contact with toothed wheel 5c is rotated by the tooth wheel, which is itself driven by motor M and the gear train 4. The freewheel 5 $R_1$ or $R_2$ ensures that driven member 1c is driven by plate $P_1$ or $P_2$, in the appropriate direction to assist the drive torque. The other plate $P_2$ or $P_1$ is disengaged.

If motor M remains stopped, for any reason whatsoever, it is possible to drive driven member 1c from the drive shaft 2 without driving either the driven plate $P_1$ or $P_2$, or gear train 4 or motor M even if the torque applied is sufficient to cause coupling since the freewheel $R_1$ or $R_2$ associated with the engaged plate $P_1$ or $P_2$ does not cause rotation of this plate through the driven member 1c.

The invention allows the driven member to be driven by means of the drive shaft without having to overcome the inertia of the gear train and the motor when this latter is stopped.

Figure 5:
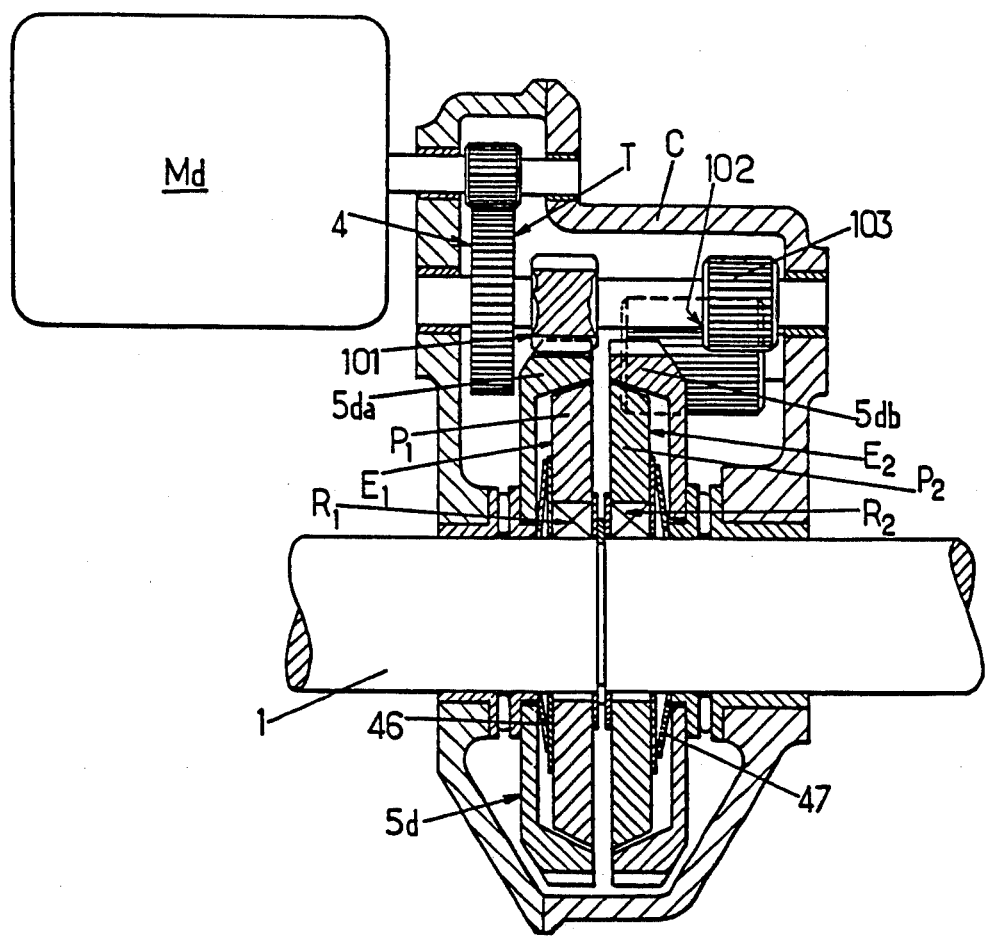
FIG. 5 shows another embodiment of the mechanism of the invention.

According to another possible embodiment with reference to FIG. 5, motor Md is provided for rotation solely in one direction. Identical elements, or elements having similar roles to those already described with reference to FIG. 3, are designated by the same reference numbers or letters to which the letter "d" has in proper cases been added, without description thereof being taken up again in detail. The means for reducing the speed of the motor Md then comprise two gear trains 101 and 102. Gear train 102 has a pinion 103 more than the other so that the two output wheels 5da and 5db of the gear trains rotate in opposite directions, with the same absolute speed. Clutches $E_1$, $E_2$, whose driven plates $P_1$, $P_2$ are mounted on the driven member through freewheels $R_1$, $R_2$ working in opposite directions, are then associated respectively with the two output wheels 5da and 5db of the two gear trains.

According to a first variation, the two toothed output wheels may be mounted for freely sliding in the axial direction with respect to the casing, whereas the driven member is secured against sliding with respect to this casing. The means for controlling the clutch is adapted to axially move the toothed wheels so as to bring into action the appropriate clutch.

According to another variation, the two output wheels are secured against axial movement whereas the driven member is mounted with the possibility of axial sliding. The driven plates of the clutches are connected for translation to this driven member.

I claim:

1. A rotary assistance mechanism adapted to be coupled to a driven member capable of rotating alternately in two directions in response to the rotation of a drive shaft, comprising:
   (a) a rotary assistance motor,
   (b) reducing means for reducing a speed of said motor,
   (c) two clutches associated respectively with said two rotational directions and each having a drive clutch member capable of being driven by said motor and a driven clutch member, and
   (d) control means for controlling said clutches to actuate one of said clutches depending on a direction and amplitude of a torque applied to the drive shaft such that said driven member is driven by said motor through said reducing means in a desired direction by means of said actuated clutch, said driven clutch members of said two clutches being rotatably connected to the driven member by means of two respective unidirectional coupling means corresponding respectively to both said opposite rotation directions of said driven member such that said respective unidirectional coupling means operate respectively to impart opposite directions of rotation to said driven member and such that the driven member is rotatably driven by an actuated clutch but a non-actuated clutch will not be driven by the driven member.

2. The assistance mechanism according to claim 1, characterized by the fact that each unidirectional coupling means is formed by a freewheel.

3. The assistance mechanism according to claim 1 in which the reduction means comprise at least one gear train which comprises a toothed output wheel coaxial with the driven member, characterized by the fact that this toothed wheel is mounted free for axial sliding with respect to the casing whereas the driven member is secured against axial sliding with respect to this casing, the means for controlling the clutch being adapted to move axially the toothed wheel(s) so as to ensure the bringing into action of the appropriate clutch.

4. The mechanism according to claim 3, characterized by the fact that the means for controlling the clutch comprise a transverse shaft integral with an end-piece, coaxial with the driven member, and mounted freely sliding with respect to this member and with respect to the drive shaft, said shaft passing radially through at least one aperture in the form of a ramp inclined with respect to the longitudinal direction, provided in the driven shaft, resilient return means being further provided between the end-piece and the driven member, the cooperation of said shaft with the aperture, under the effect of a torque applied to the drive shaft, causing axial sliding of the toothed wheel in the appropriate direction.

5. The mechanism according to claim 4 in which the motor is provided for rotation in both directions, the reduction means comprising a single gear train which comprises a single toothed output wheel, characterized by the fact that the clutches are provided on each side of this toothed wheel.

6. The mechanism according to claim 5, characterized by the fact that the toothed wheel is hollow and that the means for controlling the clutch are disposed in the inner volume of this wheel.

7. The mechanism according to claim 1 in which the reduction means comprise at least one gear train which comprises a toothed output wheel coaxial with the driven member, characterized by the fact that the toothed wheel is secured against axial movement with respect to the casing whereas the driven member is mounted with possibility of axial sliding relative to this casing, the means for controlling the clutch being adapted to move this driven member axially for bringing into action the appropriate clutch.

8. The mechanism according to claim 7 in which the motor is provided for rotation in both directions, the reduction means comprising a single gear train which comprises a single toothed output wheel coaxial with the driven member, characterized by the fact that the toothed wheel is hollow and that the clutches are disposed in the inner volume of this toothed wheel, the plates of these clutches being connected for translation to the driven member.

9. The mechanism according to claim 7, characterized by the fact that the means for controlling the clutch comprise gear means provided between the driven member and a member to be controlled, adapted to create an axial reaction, in response to the application of a torque, this axial reaction causing a movement of the driven member.

10. The mechanism according to claim 1, in which the motor is provided for rotation in a single direction, the reduction means comprising two gear trains, one of which comprises a pinion more than the other so as to ensure, at its output, a rotational direction the reverse of that of the output of the other train, each gear train comprising a toothed output wheel coaxial with the driven member, characterized by the fact that the two clutches are associated respectively with the toothed output wheel of a gear train.

* * * * *